Oct. 7, 1969  A. R. FISHER  3,470,770
TORQUE SENSITIVE RELEASABLE SERVO FOR A FRICTION
TORQUE ESTABLISHING DEVICE
Filed Dec. 21, 1967  3 Sheets-Sheet 1

INVENTOR:
Alan R. Fisher
BY John A. Faulkner
and Donald J. Harrington
ATTORNEYS

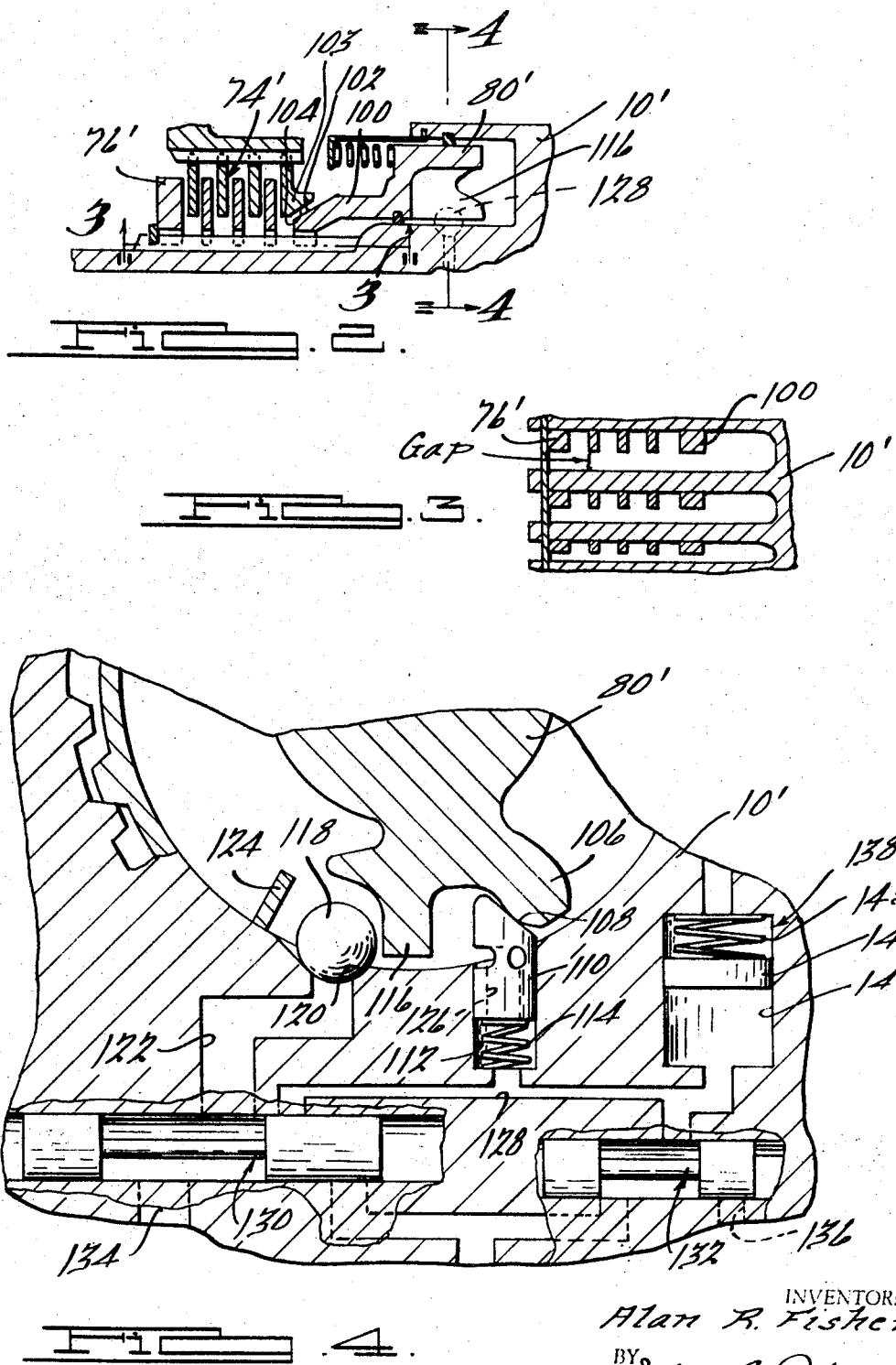

INVENTOR:
Alan R. Fisher

United States Patent Office 3,470,770
Patented Oct. 7, 1969

---

3,470,770
TORQUE SENSITIVE RELEASABLE SERVO FOR A FRICTION TORQUE ESTABLISHING DEVICE
Alan R. Fisher, Wayne County, Mich., assignor to Ford Motor Company, Dearborn, Mich., a corporation of Delaware
Filed Dec. 21, 1967, Ser. No. 692,432
Int. Cl. F16h *57/10, 3/74*
U.S. Cl. 74—751                                              8 Claims

ABSTRACT OF THE DISCLOSURE

This specification describes a torque delivery gear system having a releasable servo for a friction clutch or brake that is sensitive to changes in the direction of torque delivery. The servo includes a movable piston that actuates friction discs. A lost motion connection is provided between the piston and its cooperating cylinder so that relative angular indexing of the piston with respect to the cylinder initiates a response of the control valves associated with the servo. The control valves include a fill valve element and an exhaust valve element which are actuated in alternating sequence as a torque reversal occurs thereby providing automatic clutch release upon a torque reversal and a rapid clutch application as the normal direction of torque delivery is restored.

---

Brief summary of the invention

The improvements of my invention are adapted to be used in a friction clutch or brake in automatic, geared power transmission mechanisms. The relative motion of gear elements in transmission mechanisms can be controlled to establish several torque delivery paths, each path being characterized by a different speed ratio as power is delivered through the transmission mechanism from the power input shaft to the power output shaft. In a preferred form of my invention, one element of the gearing is anchored to provide a torque reaction point in the gear system as a friction clutch establishes a driving connection between the power input shaft and another element of gearing. When the torque is being delivered from the power input shaft to the power output shaft, the torque reaction acting on the aforementioned one gear element is transferred to the transmission housing through the friction brake. The brake is applied and released by a fluid pressure operated servo.

When a ratio change is made, the brake is released and another friction torque establishing device is applied. It is necessary, therefore, to establish a timed relationship between the release of the brake and the application of the other torque establishing devices during the shift interval. A torque reversal occurs in the friction brake as the torque transmitting capacity of the other friction torque establishing device increases. At that instant, the piston of the servo of my invention is displaced angularly with respect to its cooperating annular cylinder. This angular motion is transmitted to fluid pressure distribution valves, one of which establishes and interrupts communication between the servo working chamber and the exhaust region, and the other of which establishes and interrupts fluid communication between the fluid pressure source and the working chamber. As one valve is opened, the other is closed in timed relationship.

The servo for one friction torque establishing device is arranged to provide an interruption in the pressure feed passage and an opening of the exhaust flow passage for the pressure chamber as the torque reverses upon application of the other friction torque establishing device. It is unnecessary, therefore, to provide complex timing devices in the system since the first device, upon a torque reversal, automatically will become released or "phased-out" upon a build-up in the torque transmitting capacity of the other device.

When the transmission mechanism is subsequently conditioned for operation in the original speed ratio, it becomes necessary to reapply the brake. This is done by releasing the previously engaged clutch whereby a driving torque in the positive driving direction then is transmitted once again through the brake. The resulting torque reversal will allow a return of the angular position of the brake servo with respect to its cylinder to a position that will cause the exhaust flow path for the brake servo working chamber to become interrupted as the fluid feed passage is re-established. At this time control pressure from a previously energized accumulator is transferred through the opened control valve to establish a rapid fill of the working chamber with a brake applying pressure.

In this way an upshift off the brake during the acceleration period is simplified and made smoother with minimum inertia forces. At the same time the brake automatically releases to provide an improved downshift from a higher ratio to an underdrive ratio that requires the application of the brake.

Brief description of the figures of the drawings

FIGURE 2 is a partial assembly view of a modified form of friction disc clutch which may be used in a geared transmission of the type shown in FIGURE 1;

FIGURE 3 is a cross-sectional view taken along the plane of section line 3—3 of FIGURE 2;

FIGURE 4 is a cross-sectional view taken along the plane of section line 4—4 of FIGURE 2;

Particular description of the invention

Figure 1:
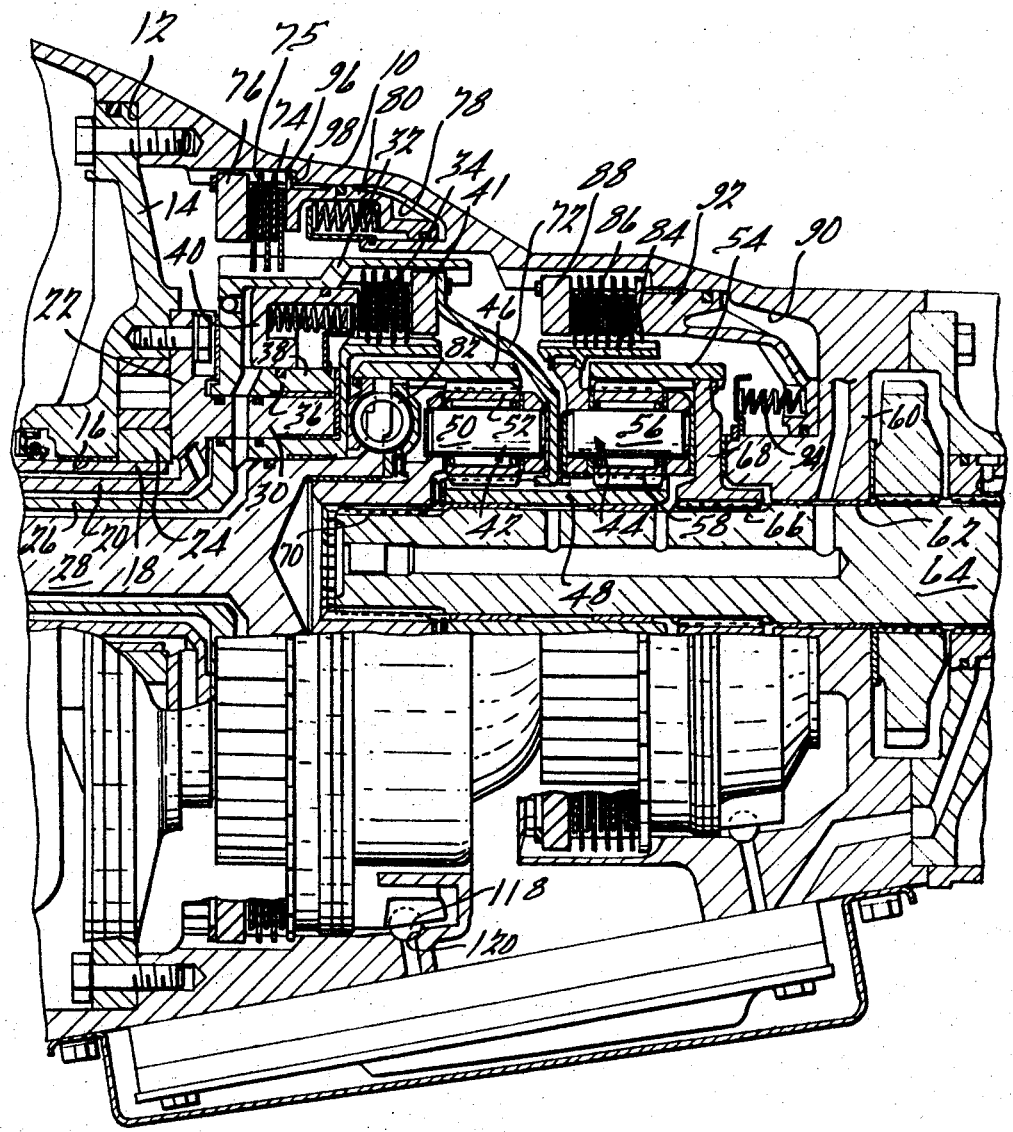
FIGURE 1 shows in longitudinal cross-sectional form a geared power transmission mechanism capable of embodying the improved clutch structure of my invention.

In FIGURE 1 numeral 10 designates the casing of the transmission mechanism. The casing may be bolted to the cylinder block of an internal combustion engine in an automotive vehicle driveline. The left-hand side of the housing 10 has a shoulder 12 to which is bolted the periphery of a bearing support wall 14. The central region of the wall 14 is formed with a bearing opening 16 in which is journaled a sleeve shaft 18 which forms a hub for an impeller shell for a hydrokinetic torque converter. This shell is connected to the crankshaft of the internal combustion engine.

Disposed within the sleeve 18 is a stationary stator support sleeve 20 which is flanged at 22 to provide a bolted connection with the inner face of the wall 14. It cooperates with the wall 14 to define a pump cavity which receives the positive displacement pump elements of pump 24. This form a pressure source for the clutch and brake servos of the automatic control valve system which will be described in part with reference to the other figures.

A hydrokinetic torque converter, not shown, includes a turbine that is connected drivably to shaft 26. Shaft 26 is in the form of a sleeve situated within the sleeve 20. A central torque delivery shaft 28 can be clutched to the turbine or to the crankshaft by a clutching arrangement, not shown.

The radial flange 22 on the sleeve 20 is formed with a bearing support in the form of a cylindrical boss 30. The right-hand end of the shaft 26 is journaled on the boss 30 directly. The right-hand end of the shaft 28 in turn is journaled on the end of shaft 26. Clutch drum 32 for a multiple disc clutch assembly 34 is formed with a hub 36, which also is journaled on the boss 30.

Sleeve shaft 26 is formed with an externally splined clutch element that carries internally splined friction clutch discs for the clutch 34. The inner periphery of the drum 32 is adapted to carry externally splined clutch discs for the clutch 34. Drum 32 defines an annular cylinder 38 within which is positioned an annular piston 40. A clutch reaction ring 41 is carried by the drum 32 at one side of the clutch discs for clutch 34. As fluid pressure is admitted to the pressure cavity defined by piston 40 and cylinder 38, the clutch 34 connects drivably the shaft 26 to the drum 32.

A pair of simple planetary gear units is indicated at 42 and 44. Gear unit 42 includes a ring gear 46, a sun gear 48, which is common also to the gear unit 44, a planetary carrier 50 and planet pinions 52 rotatably supported on the carrier 50 in meshing engagement with the ring gear 46 and the sun gear 48.

Gear unit 44 includes, in addition to the sun gear 48, a ring gear 54, a carrier 56 and planet pinions 58, the latter being journaled rotatably on the carrier 56 in meshing engagement with ring gear 54 and the sun gear 48.

Housing 10 includes an end wall 60 which has a central opening 62 through which power output shaft 64 is journaled. Shaft 64 is splined at 66 to ring gear support 68, thereby establishing a direct connection between ring gear 54 and the output shaft 64. Carrier 50 is also splined, as shown at 70, to the power output shaft 64.

Clutch drum 32 is connected directly to the sun gear 48 through a torque transfer member or drive shell 72. The outer periphery of clutch drum 32 carries brake discs for a friction brake 74. Cooperating disc brakes for the brake 74 are carried by the inner wall of the housing 10. A brake disc force reaction ring 76 is carried by the housing 10 on one side of the friction discs.

Housing 10 is formed with an annular cylinder 78 in which is received an annular piston 80. The piston 80 and the cylinder 78 cooperate to define a pressure chamber which, when pressurized, frictionally engages the brake disc of brake 74 thereby anchoring the clutch drum 32.

The shaft 28 is drivably connected to the ring gear 46. Preferably a damper spring connection 82 can be provided to cushion torque distribution to the gear 46. Carrier 56 is connected to brake element 84 which carries externally splined brake discs for a multiple disc brake 86. Cooperating brake discs for the brake 86 are secured to the inner wall of the housing 10. The brake reaction force is taken by annular reaction ring 88 and distributed to the housing 10.

Housing 10 defines an annular cylinder 90 in which is positioned an annular piston 92. A return spring 94 anchored to the end wall 60 of the housing 10 normally urges the piston 92 to a brake release position.

To establish lowest speed ratio during underdrive operation, brake 86 is applied thereby anchoring carrier 56 so that it may act as a reaction member. Turbine torque is distributed to the ring gear 46 through shaft 28. Driving torque then drives the common sun gear 48 in a direction opposite to the direction of rotation of the ring gear 46. Carrier torque on the carrier 50 is transferred directly to the output shaft 64.

A parallel torque delivery path to the output shaft 64 is established by the gear unit 44. The reverse driving motion imparted to the sun gear 48, with the carrier 56 acting as a reaction member, causes the ring gear 54 to rotate in a forward driving direction as the ring gear torque is transferred to the output shaft 64.

Second speed ratio is obtained by disengaging the brake 86 and applying the brake 74. This anchors the sun gear 48 so that it may serve as a reaction member. Turbine torque is delivered directly to the ring gear 46. Gear unit 44 is inactive. The output part of the gear unit 42 is distributed directly to the power output shaft 64.

To condition the mechanism for third speed ratio operation, shafts 26 and 28 are clutched together. Thus the elements of the gear units rotate in unison to establish a 1:1 gear ratio. Both brakes 74 and 86 are released. Clutch 34 is applied in synchronism with the release of the brake 74.

As soon as the clutch 34 gains capacity on a speed ratio change from the intermediate ratio to the high speed ratio, a torque reversal in brake 74 takes place. This occurs as the sun gear 48 loses its reaction torque and is compelled to be driven in a forward driving direction with the other gear elements. The improvement of my invention will facilitate the timed release of the brake 74 as the clutch 34 gains capacity. This is accomplished by providing a lost motion connection between an externally splined portion 96 of the piston 80 and a cooperating internally splined portion 98 of the housing 10. Further, loose external spline teeth are provided on the separator plates 75 for the brake 74 to provide angular lost motion with respect to the housing.

When the brake 74 is applied and is distributing torque reaction to the housing 10, the piston 80 then will assume one angular position with respect to the housing. When the torque is reversed, however, the piston 80 will be shifted to an extent that is permitted by the lost motion between the splined portions 96 and 98. It is this lost motion or angular adjustment that is used to control the pressure distribution to the servo pressure chamber defined by the cylinder 78 and the piston 80.

To illustrate this concept I have shown in semi-diagrammatic form in FIGURES 2, 3, 4 and 5 a modified friction brake employing this valve control feature. In the embodiment of FIGURE 2, the piston 80' is provided with an extension 100 having formed thereon an externally coned clutch surface 102. This engages an internally coned clutch surface 104 formed on a pressure plate situated on one side of the multiple brake discs.

Figure 5:
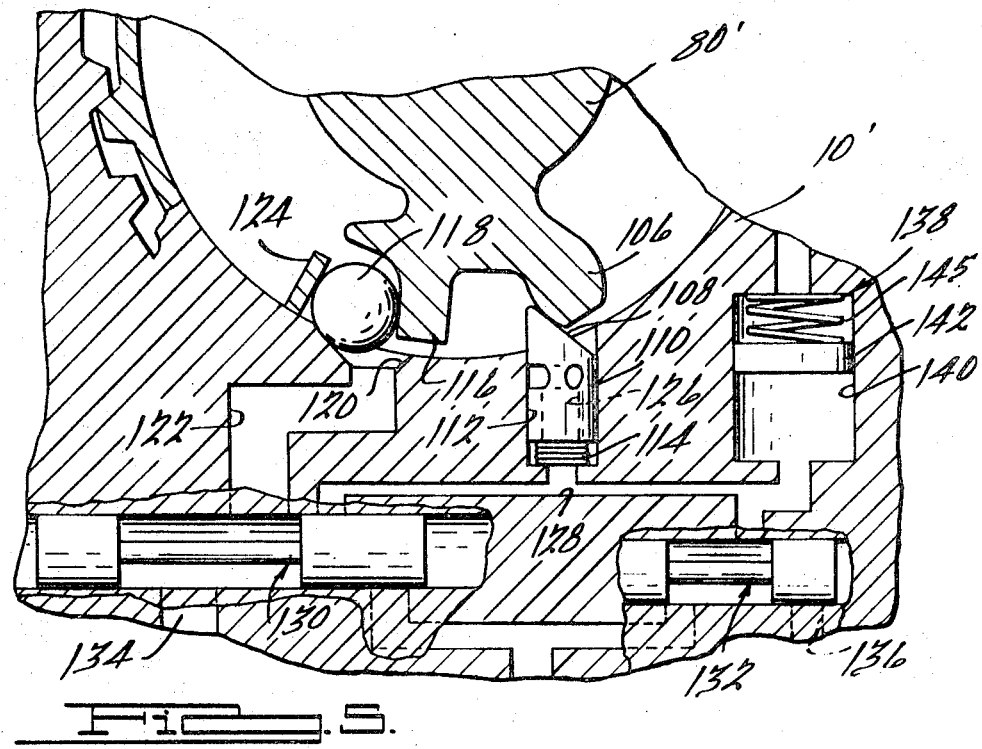
FIGURE 5 is a view similar to FIGURE 4 showing the valve elements of FIGURE 4 in a different operating position.

The piston 80', as indicated best in FIGURES 4 and 5, is formed with a projection 106 which is adapted to engage a cam surface 108 on a fill valve element 110. The valve element is situated slidably within a valve chamber 112 formed in a portion of the housing 10'. Valve element 110 is urged to an outward position by valve spring 114. A projection 116 on the piston 80' is situated directly adjacent a ball check valve element 118 which is seated in a valve seat 120 formed in the housing 10. Valve seat 120 surrounds the exhaust passage 122. A valve shoulder 124 carried by the housing 10 limits the displacement of the valve element 118 when it is unseated from the valve seat 120.

Valve element 110 is formed with a valve opening 126 which registers with the surface of the valve chamber 112 to provide a variable restriction. When the valve element 110 is positioned as shown, opening 126 is in free communication with the pressure chamber behind the piston 80'. Opening 110 communicates with the lower end of the valve chamber 112 and with control pressure feed passage 128. One end of feed passage 128 communicates with a driver-controlled manual valve 130 and with a shift valve 132. Valves 130 and 132 are provided also with exhaust ports as indicated at 134 and 136, respectively.

An accumulator 138 is in communication with feed passage 128 and comprises an accumulator chamber 140 in which is situated an accumulator piston 142. This may be biased in one direction by an accumulator spring 145.

During normal operation in the intermediate speed ratio when the brake 74 functions to distribute reaction torque from the gearing to the housing 10', the piston 80' will be indexed to the position shown in FIGURE 3, thereby establishing communication between feed passage 128 and the brake servo working chamber. The manual valve 130 can be shifted to the position shown in FIGURE 4 to open the passage 122 to the exhaust. The shift valve 132 in the FIGURE 4 position is effective to distribute control pressure directly to the feed passage 128. It may charge the accumulator 138 with the pressure that is distributed to the brake servo. The position of the valve 130 shown in FIGURE 4 will remain unchanged when a downshift occurs from the intermediate ratio to the low speed ratio. Such a downshift is signalled by shifting the shift valve in a right-hand direction.

If the transmission is operating in the intermediate speed ratio and an upshift to the third speed ratio is desired, the clutch 34 will reverse the direction of the torque reaction on the brake 74 as the clutch 34 gains capacity. This indexes piston 80' in a clockwise direction, as viewed in FIGURE 5, thereby camming the valve element 110 to a closed position and unseating the valve element 118. This exhausts the pressure chamber for the brake 74 through the exhaust port 134. The presence of oil pressure below the fill valve 110, together with the force of spring 114, will tend to return the piston 80' to a fill position, but this tendency is opposed by the torque reaction.

In the FIGURE 2 modification, the friction disc drag on brake 74' can be reduced by providing cone surfaces 102 and 104 on pressure plate 103 and piston extension 100, which will accommodate a relatively large percentage of the energy dissipation due to the slippage of the brake during the shift interval. This brake dragging condition during the shift interval is maintained by the balancing of the position of the fill valve and the check valve.

When a downshift occurs from the high speed ratio to the intermediate speed ratio, the FIGURE 5 condition applies. At that time the fill valve is opened and the check valve is closed. The accumulator 138, which continues to be pressurized, maintains a state of readiness so that the brake can be applied readily immediately upon a torque reversal. This will occur when the downshift is completed.

The function of the valves can be overruled by shifting the manual valve 130 to the right-hand position, thereby blocking the exhaust passage 134 and opening continuously the passage 122 to the control pressure source. This is a condition that is necessary for reverse drive operation or coast braking.

Figure 6:
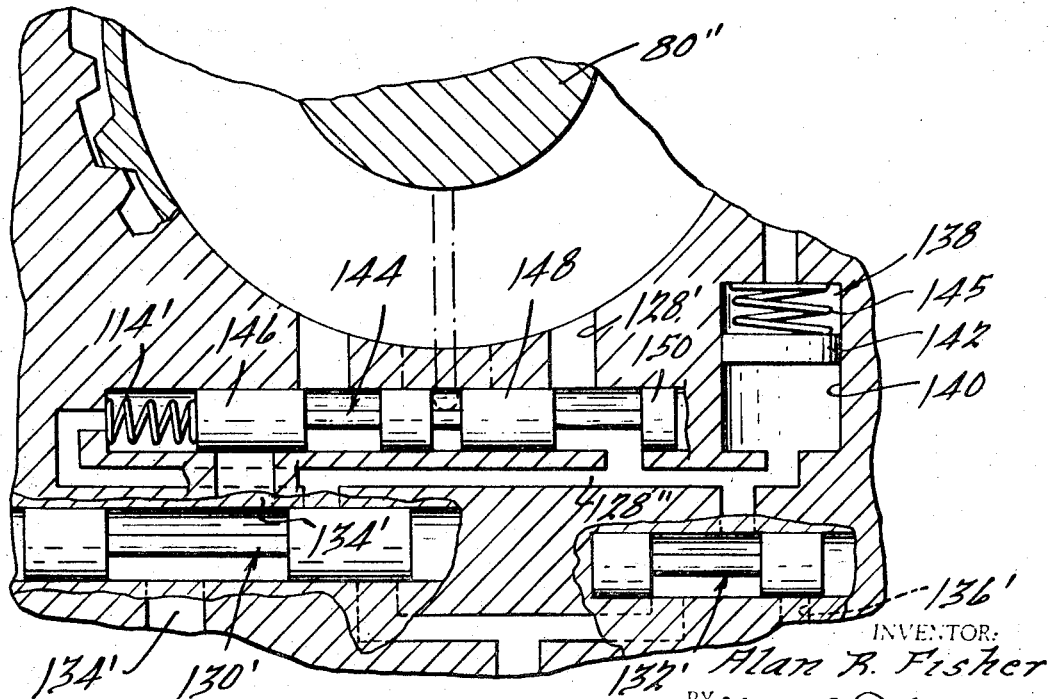
FIGURE 6 is a view similar to FIGURES 4 and 5 showing a modification of my invention.

FIGURE 6 shows an alternate construction for the valves. It includes a single valve spool 144 which incorporates the function of the previously described check valve 118 and fill valve 110. It includes three valve lands 146, 148 and 150, valve land 146 opening and closing the exhaust port 134', and the valve land 148 opening and closing the control pressure feed passage 128''. The passage 128'' receives pressure from both the manual valve and the shift valve as in the previous embodiment. A mechanical connection between the piston 80'' for the brake servo and the valve spool 144 is provided, thereby shifting the valve spool in either one direction or the other depending upon the direction of torque reaction on the brake piston. A valve spring 114' may serve the purpose of the valve spring 114, thereby tending normally to urge the spool 144 to the position shown in FIGURE 6.

In the embodiment of FIGURE 6 the elements that form counterpart elements in the FIGURE 3 arrangement have been identified by similar reference characters, although prime notations have been added.

Having thus described preferred embodiments of my invention, what I claim and desire to secure by U.S. Letters Patent is:

1. In a geared power transmission mechanism having relatively movable gear elements in a housing, said gear elements being situated in a transmission housing, brake means for anchoring one gear element to said housing to provide torque reaction as torque is distributed to another element of said gearing, means for connecting a third element of said gearing to driven portions of said mechanism, clutch means for connecting together two elements of said gearing for rotation in unison, said brake means comprising a piston, a cylinder connected to said housing for receiving said piston and cooperating therewith to define a pressure cavity, a pressure source, a pair of friction elements, one friction element being connected to said housing, a rotary brake member connected to said one gear element, another friction element carried by said brake member for transmitting torque to said housing, said piston being engageable with one of said friction elements whereby a torque is applied to said piston as said brake means is engaged thus tending to rotate said piston, a pair of pressure distribution passages communicating with said cavity, a pressure feed passage communicating with said pressure source, an exhaust passage, control valve means situated in and partly defining said feed passage and said exhaust passage for distributing selectively pressure to said distribution passages and for exhausting the same through said distribution passages, means for connecting said control valve means to a friction torque transmitting element of said brake means which distributes torque to said housing and which is shiftable from one operating position to another in response to changes in direction of torque reaction, and means for limiting the degree of relative rotation of said piston with respect to said cylinder, a manual valve communicating with said pressure source, a pressure passage extending from said manual valve to said pressure cavity, one-way valve means in said pressure passage for effecting pressure distribution to said cavity upon movement of said manual valve to a pressure distributing position thereby effecting engagement of said brake means regardless of the direction of torque delivery, said one-way valve means being adapted to be actuated by a friction torque establishing element of said brake means to an open position permitting the exhaust of pressure from said cavity when torque reaction distribution to said housing is reduced.

2. The combination as set forth in claim 1 wherein said feed passage is in communication with said control valve means whereby the latter is biased normally to a position in which it establishes communication between said cavity and said feed passage as said control means blocks communication between said distributor passages and said exhaust passage.

3. The combination as set forth in claim 1 including an accumulator in fluid communication with said feed passage for normally maintaining a supply of pressurized fluid which is available to fill said cavity as the control valve means is shifted to a cavity filling position.

4. The combination as set forth in claim 2 including an accumulator in fluid communication with said feed passage for normally maintaining a supply of pressurized fluid which is available to fill said cavity as the control valve means is shifted to a cavity filling position.

5. The combination as set forth in claim 1 wherein said cylinder is connected to a portion of said housing and is of annular form, said piston being an annular piston received in said cylinder and cooperating therewith to define an annular pressure cavity, said brake means comprising a brake disc carried by said housing adjacent said piston and a cooperating friction brake disc connected to said rotary brake member, one portion of said control valve means being adapted to progressively restrict and to progressively open one distributor passage to provide a controlled rate of feed from said feed passage to said cavity as the direction of torque reaction on brake means is changed during a speed ratio change.

6. The combination as set forth in claim 2 wherein said cylinder is connected to a portion of said housing and being of annular form, said piston being an annular piston received in said cylinder and cooperating therewith to define an annular pressure cavity, said brake means comprising a brake disc carried by said housing adjacent said piston and a cooperating friction brake disc connected to said rotary brake member, one portion of said control valve means being adapted to progressively restrict and to progressively open one distributor passage to provide a controlled rate of feed from said feed passage to said cavity as the direction of torque reaction on brake means is changed during a speed ratio change.

7. The combination as set forth in claim 3 wherein said cylinder is connected to a portion of said housing and is of annular form, said piston being an annular piston received in said cylinder and cooperating therewith to define an annular pressure cavity, said brake means comprising a brake disc carried by said housing adjacent said piston and a cooperating friction brake disc connected to said rotary brake member, one portion of said control valve means being adapted to progressively restrict and to progressively open one distributor passage to provide a controlled rate of feed from said feed passage to said cavity as the direction of torque reaction on brake means is changed during a speed ratio change.

8. The combination as set forth in claim 4 wherein said cylinder is connected to a portion of said housing and is of annular form, said piston being an annular piston received in said cylinder and cooperating therewith to define an annular pressure cavity, said brake means comprising a brake disc carried by said housing adjacent said piston and a cooperating friction brake disc connected to said rotary brake member, one portion of said control valve means being adapted to progressively restrict and to progressively open one distributor passage to provide a controlled rate of feed from said feed passage to said cavity as the direction of torque reaction on brake means is changed during a speed ratio change.

References Cited
UNITED STATES PATENTS

| | | | |
|---|---|---|---|
| 2,818,708 | 1/1958 | Kelley | 60—54 |
| 2,856,794 | 10/1958 | Simpson | 74—763 |
| 3,251,245 | 5/1966 | Foerster | 74—751 |
| 3,381,547 | 5/1968 | Forster et al. | 74—751 |

ARTHUR T. McKEON, Primary Examiner

U.S. Cl. X.R.

74—763